United States Patent [19]

Williams

[11] Patent Number: 5,418,334
[45] Date of Patent: May 23, 1995

[54] RELATIVE POSITION TRACER LAMP INDICATOR

[76] Inventor: Kenyon D. Williams, 8322 Rolling Rd., Manassas, Va. 22110

[21] Appl. No.: 102,051

[22] Filed: Aug. 4, 1993

[51] Int. Cl.[6] ............................................. H04L 15/00
[52] U.S. Cl. ...................................... 178/1; 178/2 R; 178/74
[58] Field of Search ............................. 178/1, 2 R, 74; 379/326, 327

[56] References Cited

U.S. PATENT DOCUMENTS

| | | | |
|---|---|---|---|
| 4,618,194 | 10/1986 | Kwilos | 178/1 |
| 4,649,236 | 3/1987 | De Luca et al. | 379/327 |
| 4,670,626 | 6/1987 | Fisher | 379/329 |
| 4,737,985 | 4/1988 | De Luca | 379/326 |
| 4,811,169 | 3/1989 | De Luca | 379/327 |
| 5,220,600 | 6/1993 | Chouanard | 379/327 |
| 5,265,156 | 11/1993 | Eason et al. | 379/327 |

OTHER PUBLICATIONS

*Monitoring the Performance of Digital Multiplex Circuits,* Al Geigel, Bell Laboratories Record, vol. 49, No. 7, Aug. 1971.

*Primary Examiner*—Stephen Shin
*Assistant Examiner*—Vijay Shankar
*Attorney, Agent, or Firm*—Richard Litman

[57] ABSTRACT

Digital signal cross connect communication systems include a plurality of tracer circuits within a particular shelf, a plurality of shelves within a particular rack, a plurality of racks within a particular row, and, generally, a plurality of rows within the office in which the circuitry of the digital signal cross connect communication system is located. In order to facilitate a technician in determining the specific location of an engaged tracer circuit, row indicator lamps may be provided to indicate the particular row the engaged tracer circuit is located in. Also, rack lamp indicators located above each rack and shelf lamp indicators located within each shelf may also be provided to indicate the particular rack and shelf an engaged tracer circuit is located.

4 Claims, 3 Drawing Sheets

RELATIVE POSITION TRACER LAMP INDICATOR

BACKGROUND OF THE INVENTION

1. Field of the Invention

The present invention relates to lamp indicators for digital signal cross-connect (DSX) frames. More particularly, the present invention pertains to those DSX frames utilizing power amplifiers and flasher circuits connected to shelve lamp indicators or rack tamp indicators for indicating to the technician which shelf or rack to find the flashing tracer lamp indicator.

2. Description of the Prior Art

Presently tracer lamps, usually small LEDs, are utilized in communication offices to indicate the other end of a cross connected circuit (T-1 or DS3). Each tracer lamp is located on a particular shelf in a particular rack of a particular row. There are generally several rows in any communications office, each row having several racks of shelves. The tracer lamp indicators flash when first engaged by a monitor chord for approximately forty-five (45) seconds. This is to give the technician enough time to find the other end of the circuit. After the forty-five (45) has expired, the tracer lamp remains on constantly until the monitor chord is removed.

U.S. Pat. No. 4,670,626 issued Jun. 2, 1987 to Thomas M. Fisher discloses a cross-connect frame for digital signals having a shelf chassis in which a plurality of monitor jacks are connected in series with light emitting diodes (LEDs) along a tracer wire connection to indicate which line is being monitored.

U.S. Pat. No. 4,618,194 issued Oct. 21, 1986 to Jerald J. Kwilos discloses two timers activated upon the insertion of a monitor jack, the first causing the appropriate tracer lamp LED to flash at a predetermined rate and the second causing the tracer lamp LED to cease flashing and remain on constantly.

*Monitoring the Performance of Digital Multiplex Circuits*, an article written by Al Geigel, Bell Laboratories Record, Vol. 49, No. 7, in August of 1971, discloses the use of audible signals and visual signals on a monitor to indicate to maintenance personnel the existence of a fault in the multiplexer-demultiplexer frame of a digital signal cross-connect frame system, as well as the use of indicator lamps to indicate to the technician which multiplexer or demultiplexer was being monitored when the alarm occurred, which input or output was being monitored, and whether the alarm was due to bit errors or code violations.

None of the above inventions and patents, taken either singly or in combination, is seen to describe the instant invention as claimed.

SUMMARY OF THE INVENTION

Within digital system cross-connect (DSX) systems, tracer lamps are utilized in the communications office associated therewith to indicate the other end of a cross connected circuit. These indicators flash when first engaged for approximately forty-five (45) seconds to give the technician time to find the other end of the circuit. After the forty-five (45) seconds has expired, the tracer lamp stays on constantly until the monitor chord connected to the monitor jack associated with the same circuit as the tracer lamp is removed (see Kwilos, made of record and incorporated herein by reference).

The present invention recognizes the problem of finding the tracer lamp indicators associated with the circuit connected to the circuit being monitored. The tracer lamps are usually small LEDs housed in a shelf containing the circuits associated with an individual LED tracer lamp. There are usually fifty (50) to sixty-four (64) tracer lamps within a given shelf. There are generally ten (10) to fourteen (14) shelves within a given rack. Further, there are generally a plurality of racks within a given row and a plurality of rows within a given DSX communications office. Therefore, even in the smaller DSX facilities, there exists the problem of finding a particular flasher tracer lamp indicator.

The present invention set forth a solution to the problem of finding a particular tracer lamp. The present invention monitors a tracer wire connection associated with the location of a cross connect circuit and connected to the tracer lamp and monitor jack associated therewith. Circuitry is provided for monitoring any rapid change in current therein, such as would occur upon the insertion of a monitor plug into the monitor jack. Upon detecting such a power draw from the tracer wire connection, a relative position indicating lamp is activated so as to flash for a predetermined period of time, after which it is turned off. The relative position indicator lamp is used to indicate the relative location of a cross-connect circuit connected to the tracer wire connection.

For example, the relative position indicator lamp may be located on the shelf containing a plurality of cross connect circuitry and would be activated upon the insertion of a monitor plug into any of the monitor jacks associated with the cross-connect circuits located within that shelf. Alternatively, the relative position indicator lamp may be located above the rack containing a plurality of shelves, each having a plurality of cross-connect circuits located therein. The engagement of any one of the cross-connect circuits within the rack would activate the relative position indicator lamp above the rack. As a further alternative, the relative position indicator could be associated with a particular row of racks. In this instance, the engagement of any cross-connect circuit within any of the racks of the particular row would cause the position indicator lamp associated therewith to flash for a predetermined amount of time, after which the position indicator lamp would be turned off.

In the preferred embodiment of the present invention, the relative position indicator lamp would preferably be a lamp larger than the tracer lamp LEDs. Further the relative position indicator lamp is powered from a separate line than the tracer wire connection to which the monitor jack and tracer lamp LED is connected. Circuitry is provided within the present invention to provide to amplify the power provided to the relative position lamp indicator lamp. Any company utilizing DSX communication systems would benefit from the present invention by decreasing the amount of time required to locate a particular cross-connect circuit.

Accordingly, it is a principal object of the invention to provide a relative position lamp indicator to indicate the row, rack, or shelf having an engaged cross-connect circuit located therein.

It is another object of the invention to provide an amplified power output to the relative position lamp indicator so as to be brighter than the tracer lamp indicators powered by the tracer wire connection associated therewith.

It is a further object of the invention to cause the relative position lamp indicator to flash at a predetermined rate for a predetermined period of time.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
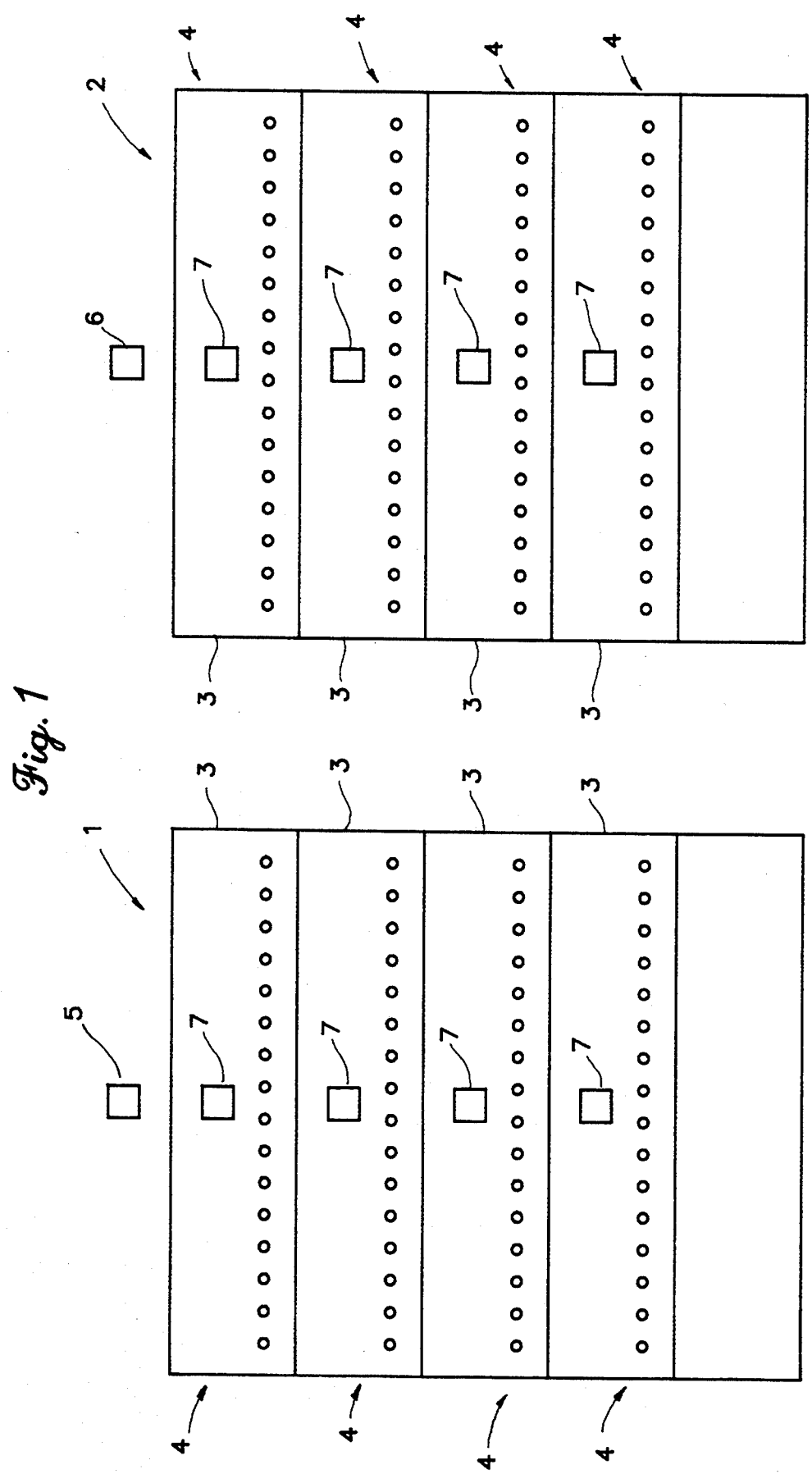
FIG. 1 is an environmental view of an application for the present invention.

FIG. 1 illustrates one use of the present invention. As shown in FIG. 1, a first rack 1 and a second rack 2 are located in a particular row within a DSX communication system. Both the first rack 1 and the second rack 2 have a plurality of shelves 3 of cross-connect circuits. Each shelf 3 has a plurality of tracer lamps 4 associated with each cross-connect circuit (not illustrated). A relative position indicator lamp could be used to identify the particular rack containing an engaged cross-connect circuit. For example, the relative position indicator lamp could be a first rack indicator lamp 5 activated if an engaged circuit exists in the first rack 1. The relative position indicator lamp could be a second rack indicator 6 activated if an engaged circuit exists in the second rack 2. Further relative position indicator lamps may be used within a shelf so as to indicate a particular shelf containing an engaged cross connect circuit.

As shown in FIG. 1, each shelf 3 contains a shelf lamp indicator 7 activated if a cross-connect circuit is engaged within a particular shelf associated therewith. Clearly a plurality of devices of the present invention may be used within a DSX communication system so that each shelf, rack, and row located therein would have a relative position lamp indicator associated with each of the shelves, racks, and rows.

Figure 2:
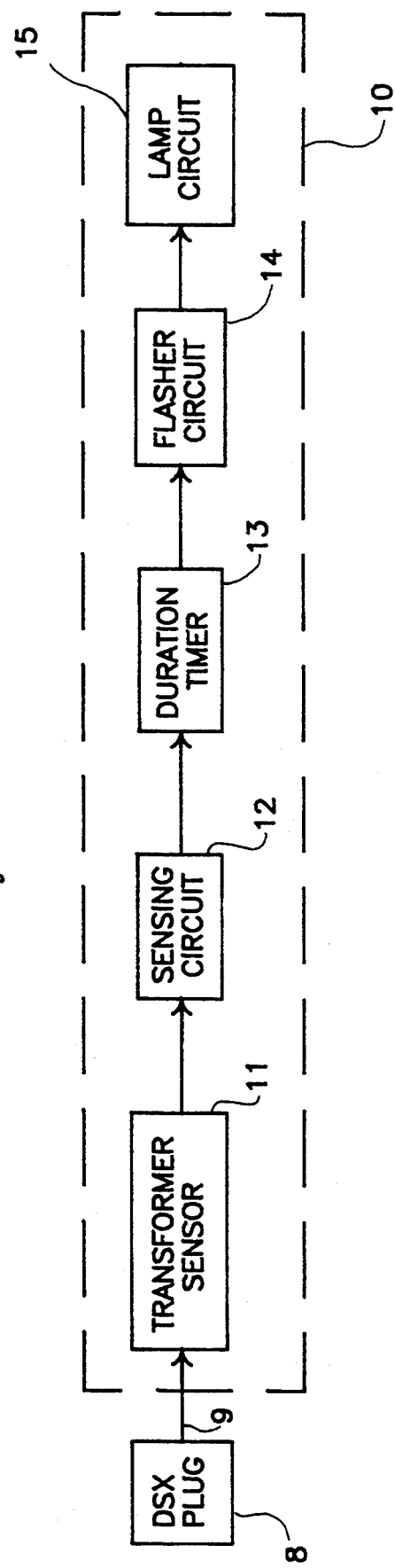
FIG. 2 is a block circuit diagram of the present invention.

The device 10 of the present invention as illustrated in FIG. 2, includes a transformer sensor 12 connected to a tracer wire connection 9 associated with a particular cross-connect circuit within a DSX communication system. Upon the detecting the insertion of a DSX plug 8, a sudden change of current is caused to flow through the tracer wire connection 9. The transformer sensor 11 detects this change of current and produces an output indicative thereof to drive a trigger sensing circuit 12 for producing a trigger pulse which in turn activates a duration timer 13. The duration timer drives a flasher circuit 14 for a predetermined period of time when activated. The flasher circuit 14 causes the lamp circuit 15 to turn the relative position indicator lamp on and off at a predetermined rate for as long as the duration timer 13 provides power thereto.

Figure 3:
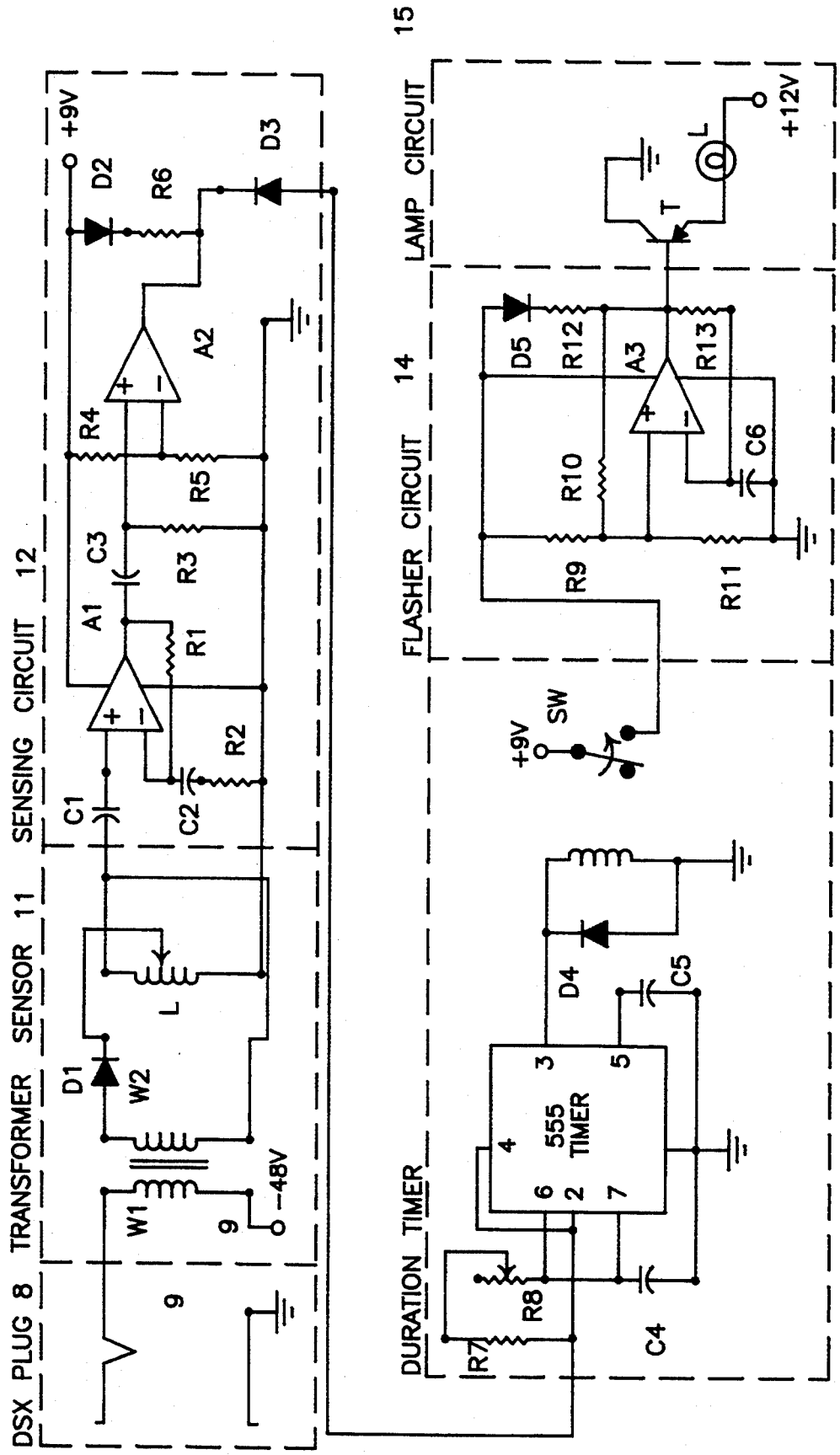
FIG. 3 is a schematic diagram of the preferred embodiment for the present invention.

FIG. 3 illustrates the preferred embodiment of the present invention. A primary winding W1 of a transformer is connected in series with a tracer wire connection. Upon the insertion of a monitor plug, current begins to flow through the primary winding W1. The rapid change in current through the primary winding causes an induced current to occur in the secondary winding W2 of the transformer. This current flows in a direction through the diode D1 to a center tap of an inductor L producing an output thereacross. The output produced across the inductor L drives the sensing circuit to produce a trigger pulse. Capacitors C1, C2, and C3 along with resistors R1, R2, R3, and operational amplifier A1 form an amplifier which shapes the output produced across the inductor L into a pulse. The operational amplifier A2 along with diodes D2, D3, resistors R4, R5, and R6 form a comparator circuit which produces a trigger pulse supplied to the duration timer 13. The duration timer includes a 555 timer configured as an astable multivibrator.

The trigger pulse is supplied to pins 2 and 4 of the 555 timer as well as to pins 6 and 7 through the resistor R7 and the potentiometer R8. The resistor R7 and potentiometer R8 along with the capacitor C4 connected to pin 7 and the capacitor C5 connected to pin 5 determine the duration of the one shot pulse produced at the output of the 555 timer. The output of the 555 timer is used to drive a relay coil RC, which in turn causes a switch SW to provide power to the flasher circuit 14. The flasher circuit 14 consists of an operational amplifier A3, resistors R9, R10, R11, and R12 a flash rate adjuster R13 (i.e., a potentiometer), capacitor C6, and diode D5. The flasher circuit 14 produces a periodic series of power pulses to drive the lamp circuit 15. The lamp circuit includes a transistor T used to drive the relative position indicator lamp L.

Diode D1 is used to prevent current of a reverse polarity from passing therethrough once the monitor plug is removed. Diode D4 is connected to pin 3 and is used to prevent a negative voltage from being applied across the relay coil as falling edge of the output pulse of the 555 timer passes therethrough. The potentiometer R8 may be varied by the technician in order to vary the duration of the output pulse of the 555 timer.

It is to be understood that the present invention is not limited to the sole embodiment described above, but encompasses any and all embodiments within the scope of the following claims.

I claim:

1. A digital signal cross-connect frame communication system having a plurality of tracer wire connections from a first location to a second location, each of said plurality of tracer wire connections having at least one tracer lamp associated therewith, the improvement comprising:

a power draw detection circuit having an input selectively connectable to one of said plurality of tracer wire connections from said first location and said second location, said power draw detection circuit generating a line detection signal at an output in response to the detection of a rapid change of current at said input;

a duration timer circuit having an input connected to said output of said power draw detection circuit for providing power at an output for a predetermined period of time upon the detection of said line detection signal at said input;

a flasher circuit having an input connected to said output of said duration timer circuit for producing a periodic series of power pulses at an output once power is supplied at said input; and a lamp circuit having an input connected to the output of said flasher circuit for providing power to a lamp as power is supplied thereto from said input;

said lamp being positioned within said digital signal cross-connect frame communication system so as to be indicative of the location of said at least one tracer lamp connected to said one of said plurality of tracer wire connections.

2. The digital signal cross-connect frame communication system of claim 1, wherein said power draw detection circuit further comprises a transformer sensor circuit used for sensing said rapid change of current, said transformer sensor circuit comprising at least;

a transformer having a primary winding connected in series with said one of said plurality of tracer wire connections;

an inductor coil having a first end, second end, and center tap;

a diode having a first end for enabling current to pass therethrough to a second end, wherein said second end prevents current from passing therethrough to said first end; and a secondary winding of said transformer having a first end connected to said first end of said diode and a second end connected to said first end of said inductor coil; wherein, said second end of said diode being connected to said center tap of said inductor coil.

3. The digital signal cross-connect frame communications system of claim 2, wherein said power draw detection circuit further comprises a trigger sensor circuit comprising at least;

an amplifier having an output and an input, said input connected across said first and second ends of said inductor coil; and, a comparator having an input connected to said output of said amplifier and an output for producing a trigger pulse thereat upon detecting a voltage magnitude at said input thereof greater than a predetermined voltage magnitude.

4. The digital signal cross-connect communication system of claim 1, wherein said predetermined period of time being adjustable.

* * * * *